(12) United States Patent
Yamada et al.

(10) Patent No.: US 8,339,636 B2
(45) Date of Patent: Dec. 25, 2012

(54) MULTI-FUNCTION PERIPHERAL APPARATUS FOR PROCESSING UNIFIED JOB STEPS

(75) Inventors: Muneki Yamada, Osaka (JP); Takashi Toyoda, Osaka (JP); Hideki Tennichi, Osaka (JP); Akihiro Kanekawa, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 1399 days.

(21) Appl. No.: 11/698,883

(22) Filed: Jan. 29, 2007

(65) Prior Publication Data

US 2007/0177180 A1    Aug. 2, 2007

(30) Foreign Application Priority Data

Jan. 27, 2006 (JP) ................... 2006-019838
Jan. 27, 2006 (JP) ................... 2006-019839
Jan. 27, 2006 (JP) ................... 2006-019840
Jan. 27, 2006 (JP) ................... 2006-019841
Jan. 27, 2006 (JP) ................... 2006-019842

(51) Int. Cl.
*G06F 3/12* (2006.01)

(52) U.S. Cl. .......... 358/1.15; 700/23; 715/764; 718/106

(58) Field of Classification Search ................. 358/1.15, 358/1.13, 1.14, 1.17, 1.18, 1.9, 468, 442; 345/506; 382/303; 700/23; 399/1; 715/700, 715/255, 764; 718/106
See application file for complete search history.

(56) References Cited

U.S. PATENT DOCUMENTS 5,170,340 A * 12/1992 Prokop et al. .................. 700/23
5,579,447 A * 11/1996 Salgado ......................... 358/1.9
5,710,921 A * 1/1998 Hirose .......................... 718/106
5,920,685 A * 7/1999 Romano et al. .............. 358/1.15
6,504,621 B1 * 1/2003 Salgado ........................ 358/1.16
2002/0163666 A1* 11/2002 Iwata et al. .................. 358/1.15
2004/0027611 A1* 2/2004 Leiman et al. ............... 358/1.15
2004/0194010 A1* 9/2004 Kirihara et al. .............. 715/500
2005/0141006 A1* 6/2005 Aiyama ....................... 358/1.13
2005/0210227 A1* 9/2005 Emerson et al. ................. 713/1

FOREIGN PATENT DOCUMENTS

| JP | 04320537 A | * 11/1992 |
| JP | 10-032691 | 2/1998 |
| JP | 2002-084383 | 3/2002 |
| JP | 2003-044249 | 2/2003 |

OTHER PUBLICATIONS

Research Disclosure 499023, published Nov. 2005.*

* cited by examiner

*Primary Examiner* — King Poon
*Assistant Examiner* — David S Cammack
(74) *Attorney, Agent, or Firm* — Browdy and Neimark, P.L.L.C.

(57) ABSTRACT

The respective jobs of copying, printing, scanning, and faxing processed by an integrated application are unitarily divided into four job steps. A package of function modules selectively used in the respective jobs is classified into four groups of input, create, edit, and output function modules according to the division. A data format is unified into bitmap by a create function module, and the bitmap data is processed by an edit function module for pagination or aggregation, etc. In response to receiving setting information and a job code, a job controlling module creates job step control blocks and writes the information therein to create a job. Each of job step controlling (JSC) modules to starts a function module for each page, and after the completion thereof, creates a thread control block for the next downstream side JSC module.

9 Claims, 20 Drawing Sheets

FIG. 3

| JOB | JOB CODE | FUNCTION MODULE | | |
|---|---|---|---|---|
| | | INPUT | PROCESS | OUTPUT |
| COPY | 0 | 00 | 12 | 20 |
| PRINT | 1 | 01 | 11 | 20 |
| SCAN | 2 | 00 | 10 | 21 |
| FAX TRANS | 3 | 00 | 10 | 22 |
| FAX RECEP | 4 | 02 | 12 | 20 |

COPY

PRINT

SCAN

FAXTRANS

FAX RECEPTION

FIG.5A

| FMC | JSNo | PNo |
|---|---|---|
| SETTING INFORMATION |||

| 00 | 001 | 002 |
|---|---|---|
| MONOCHROME<br>SINGLE SIDE<br>A4 VERTICAL<br>400DPI<br>BRIGHTNESS: 128 |||

| 20 | 001 | 001 |
|---|---|---|
| UPPER CENTER<br>MARGIN: 10 mm<br>FORM: -?-<br>MS GOTHIC, STANDARD, ITALIC<br>SPACING BETWEEN ADJACENT LETTERS: 0 mm |||

| 22 | 001 | 001 |
|---|---|---|
| 13<br>24<br>NO DIVISION LINE |||

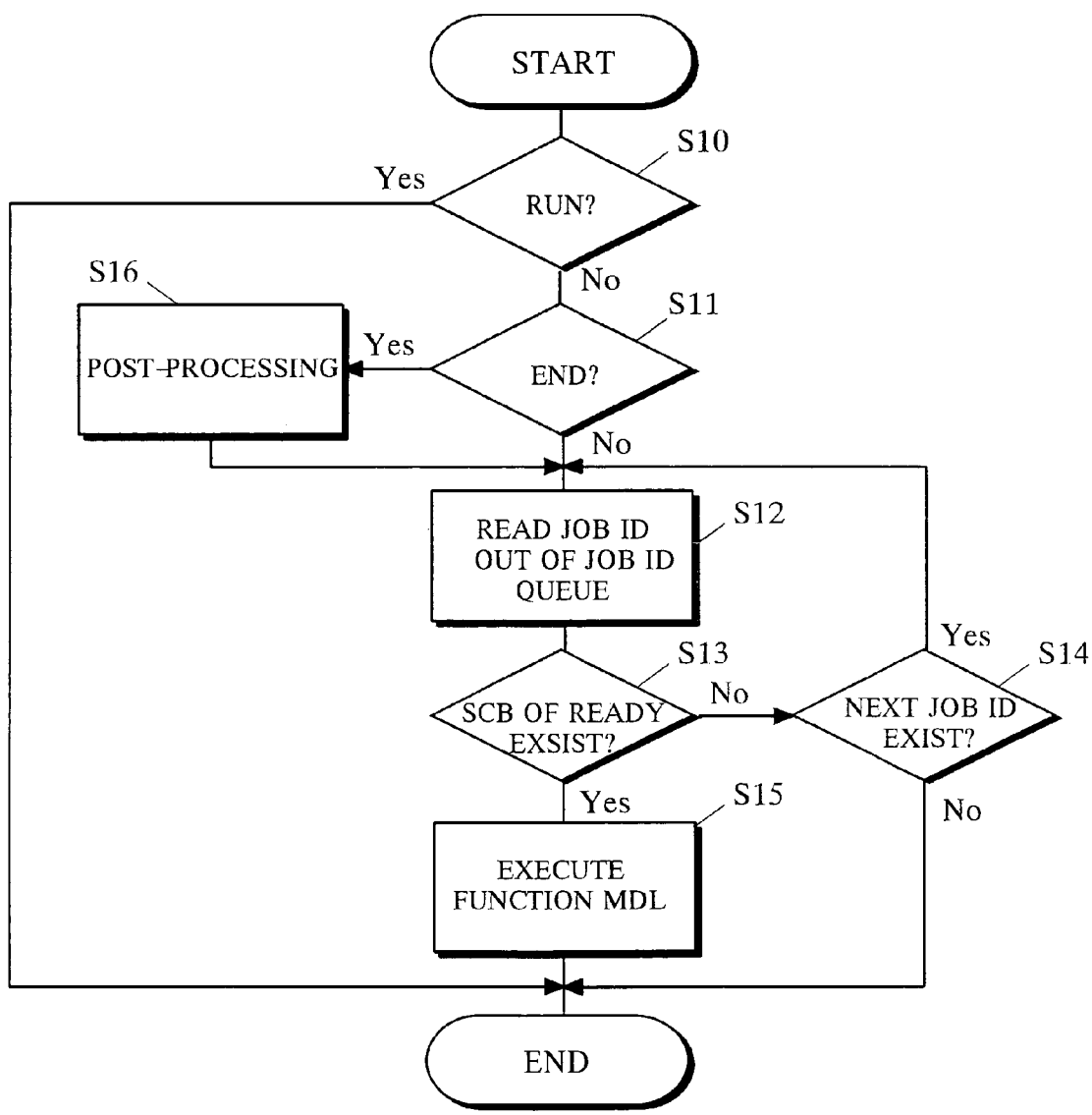

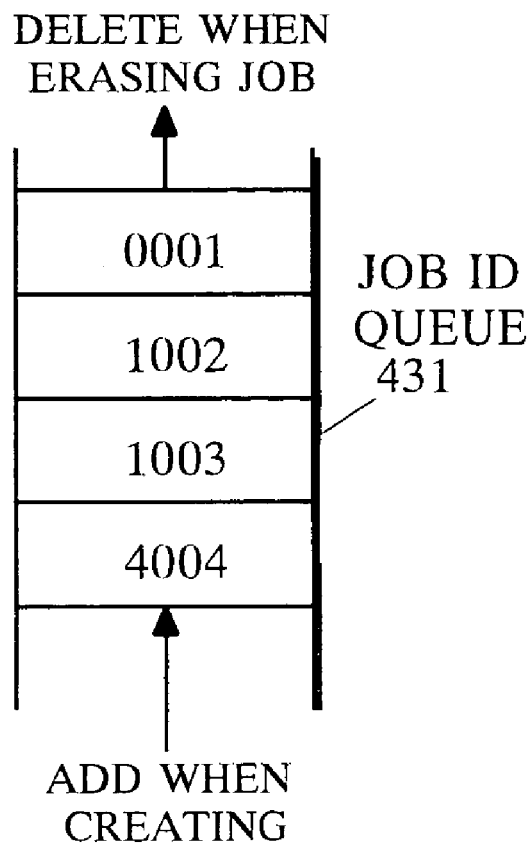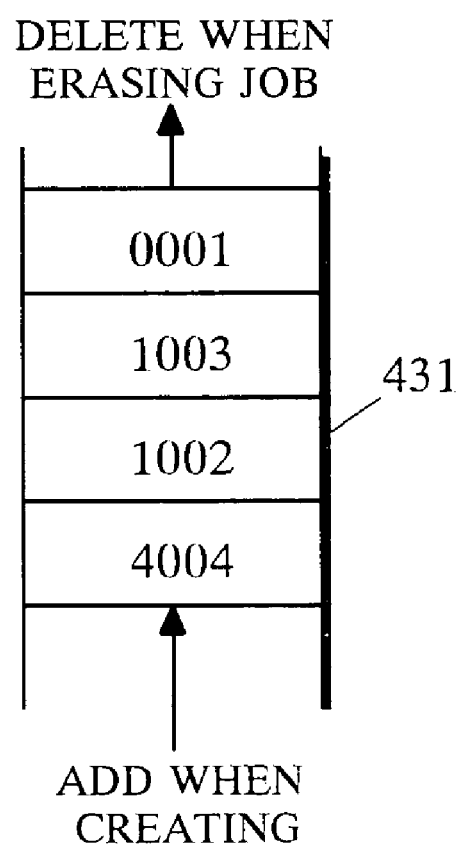
FIG.9A
FIG.9B

FIG.10A

| No. | FNC | INP | PRC | OUT | CMPL TIME |
|---|---|---|---|---|---|
| 001 | COPY | 10 | 10 | 1 | 10:24 |
| 002 | PRINT | 42 | 1 | 0 | 10:32 |
| 003 | PRINT | 3 | 0 | 0 | 10:33 |
| 004 | FAX RCP | 6 | 0 | 0 | —— |

JOB STATE   10:24

Buttons: CNC (69), ▲ (66), ▼ (67), PRO (68). Display 25.

FIG.10B

| No. | FNC | INP | PRC | OUT | CMPL TIME |
|---|---|---|---|---|---|
| 001 | COPY | 10 | 10 | 1 | 10:24 |
| 002 | PRINT | 42 | 1 | 0 | 10:32 |
| 003 | PRINT | 3 | 0 | 0 | 10:33 |
| 004 | FAX RCP | 6 | 0 | 0 | —— |

JOB STATE   10:24

FIG. 14

| JOB | JOB CODE | FUNCTION MODULE | | |
|---|---|---|---|---|
| | | INPUT | CREATE | OUTPUT |
| COPY | 0 | 00 | 10 | 30 |
| PRINT | 1 | 01 | 11 | 30 |
| SCAN | 2 | 00 | 10 | 31 |
| FAX TRANS | 3 | 00 | 10 | 32 |
| FAX RECEP | 4 | 02 | 12 | 30 |

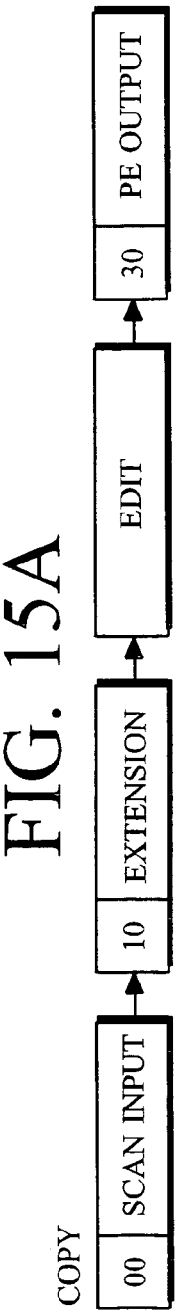
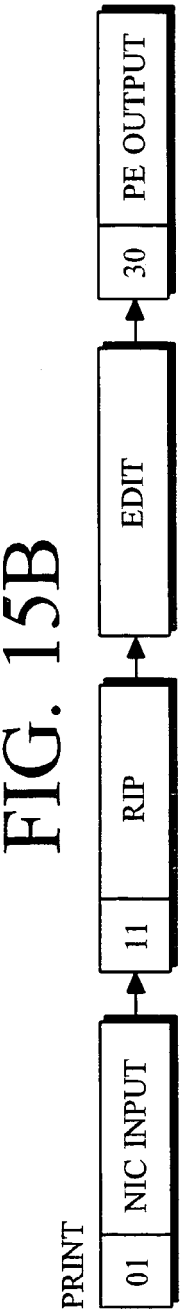
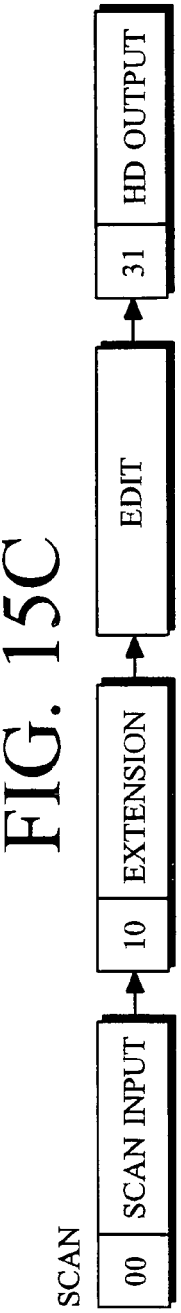
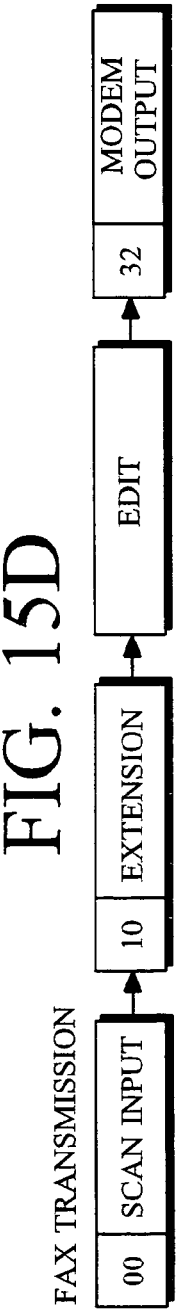
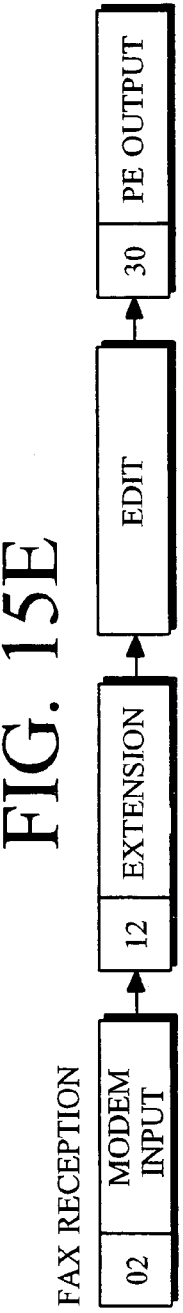

MULTI-FUNCTION PERIPHERAL APPARATUS FOR PROCESSING UNIFIED JOB STEPS

TECHNICAL FIELD

The present invention relates to a multi-function peripheral apparatus equipped with a plurality of image data inputting means such as a scanner, a communication interface and a storage, and a plurality of image data outputting means such as a printer, a communication interface, and the storage, and more particularly, to a multi-function peripheral apparatus having functions of copying, printing, scanning, and faxing to process unified job steps.

BACKGROUND OF THE INVENTION

A multi-function peripheral apparatus employs common hardware resources with a plurality of functions, thereby reducing cost and space as a whole.

JP No. 2002-84383-A discloses a platform that consists of a versatile operating system (OS) such as a UNIX, etc. and a middleware configured by integrating common functions to each application for copying, printing, scanning, and faxing so as to reduce the number of program steps of each application and to improve development efficiency of application software.

However, since the above configuration has applications for respective job kinds, and each application has its own job creating module, the job step relevancy among the job kinds is low, and the unity of the whole configuration is lacking. Therefore, the whole configuration is still complicated and the development efficiency of applications is not enough.

Further, because of the low relevancy, processing for displaying the job state to a user is complicated.

Although the above Japanese Patent Application Publication has not disclosed a parallel processing, since the plurality of applications are operated on the versatile OS such as UNIX, a general parallel processing will be performed by multi-task function of OS.

For example, when receiving facsimile image data from a modem during receiving print image data described in a PDL (Page Description Language) from a host computer, the respective inputs and respective outputs of the image data are put in a queue to process sequentially, which causes no problem. However, after the data is input, a rasterizing of print data and an extending of compressed facsimile image data are processed in parallel in time division based on the multi-task function of OS, and therefore throughput is reduced by the overhead due to switching the processing. Furthermore, the start of printing of a print job by a print engine will delay when print and facsimile jobs are running in parallel, and both jobs are liable to compete with each other, which causes the processor to wait for outputting with occurring idle time, thereby reducing throughput.

Even if dividing one job into a plurality of job steps, putting inputs in a queue in page unit at each job step, and sequentially processing them, image data among the job steps are processed in parallel so that similar problems as described above will occur.

On the other hand, JP No. H10-032691-A discloses a multi-function peripheral apparatus provided with the function of assigning priority in outputting as follows. There are provided with print queues for respective image data inputting means in order to store information regarding print job consisting of image data with a plurality of pages and print controlling data. On the basis of a print queue priority pre- defined by a user, a job controlling means selects one of these print queues to take out a piece of print job information from the selected print queue and provide it to an image forming means.

In addition, JP No. 2003-044249-A discloses a multi-function peripheral apparatus provided with the function of assigning priority in outputting as follows. In a multi-function peripheral apparatus provided with a plurality of image inputting devices of copying, printing, and faxing, which shares one printing device, there is provided a printing priority managing means for determining which request should be taken out in order when requests for printing out are simultaneously generated from the plurality of image inputting devices, and a host computer is allowed to give instructions thereto.

A user can change a printing priority for each type of multi-function peripheral apparatuses having the above described outputting function with priority.

However, in any of these multi-function peripheral apparatuses, paying attention to one output device in a case where a plurality of image inputting means are coupled to one print engine, since it is constituted to select inputted image data at output stage with taking the priority of image inputting means into consideration, it has no option but to change the priority only in units of a function such as copying, printing, or faxing, etc. For example, if the priority of copying is assigned higher, the priority of all the copy jobs is assigned higher when the plurality of copy jobs are put in a queue so that their execution order cannot be changed in units of a job.

Therefore, for example, in a case where the jobs of a print (1), fifty sheets of copies (2), three sheets of copies (3), a facsimile reception (4) are accepted in this order in a queue, and the output of facsimile reception would like to be executed after executing the output of copy (3) by changing the priority, it is required to assign the priority of copy function higher than that of facsimile reception function so as to output in order of copy (2), copy (3) and facsimile reception (4), thereby delaying the output of copy (3).

Further, even if it is constituted to enable the priority to be changed among a plurality of jobs with a same function, since the priority of respective functions and the priority of respective jobs in each function must be set, besides the operation, the configuration of software is complicated.

SUMMARY OF THE INVENTION

Therefore, it is an object of the present invention to provide a multi-function peripheral apparatus capable of improving development efficiency of software by unifying relevancy between job steps independently of job kinds by dividing each job into job steps.

It is another object of the present invention to provide a multi-function peripheral apparatus capable of simplifying and unifying a display processing for providing job states to a user by relevancy between job steps of a plurality of job kinds with a simple configuration.

In a first aspect of the present invention, there is provided a multi-function peripheral apparatus, comprising: a processor operated according to a program; a storage means coupled to the processor to store the program; a plurality of image data inputting means coupled to the processor; a plurality of image data outputting means coupled to the processor; and an instruction inputting means coupled to the processor; wherein the apparatus executes a job selected from a plurality of image forming functions by an instruction through the instruction inputting means.

According to this configuration, by integrating applications capable of executing a plurality of job kinds into one application as well as unifying relevancy between the job steps of the plurality of the job kinds, the construction of the application is put in order and simplified, thereby improving development efficiency of application software.

In addition, by this integration and unity, the display processing of job states corresponding to the processing information of the job steps can be integrated and simplified.

In a second aspect of the present invention according to the first aspect, there is provided the multi-function peripheral apparatus, wherein the image processing job step has a create job step for transforming a data format of image data input at the input job step, and an edit job step for editing the transformed image data; wherein the package of the function modules includes function modules executed by the processor in the create job step and the edit job step, wherein the job execution controlling program causes the processor to start the create job step and then the edit job step in regard to the image processing job step.

According to this configuration, advantages similar to that of the first aspect are obtained.

In a third aspect of the present invention according to the second aspect, there is provided the multi-function peripheral apparatus, wherein each function module of the create job step transforms a data format of image data input at the input job step into a specific data format common to the respective jobs; and wherein the edit function module is common to each job.

According to this configuration, since the image data of the specific data format is edited according to edit setting information, it is possible to share software resources between all the jobs with respect to an edit processing, thereby improving development efficiency of software.

In a fourth aspect of the present invention according to the second aspect, there is provided the multi-function peripheral apparatus, wherein the storage means further stores a job identification code queue as job controlling information, wherein the job execution controlling program comprises: a job execution order controlling component which causes the processor (a) to determine a job identification code according to the job selection and starting instruction through the instruction inputting means, (b) to add the job identification code into the queue, (c) to read a job identification code in the job identification code queue in alignment order, (d) to execute function modules of the respective job steps of the job indicated by the job identification code read; and a job execution order changing component which causes the processor to change the alignment order of the job identification codes in the job identification code queue according to a job execution order changing instruction through the instruction inputting means.

According to this configuration, the integrated one application, on one hand, handles the respective jobs in the same relation as each other with respect to job execution order, and on the other hand, allows to change the alignment order of the job identifying codes in the job identification code queue so that it is possible to change the execution order of the plurality of jobs in a job unit with a simple configuration.

In a fifth aspect of the present invention according to the second aspect, there is provided the multi-function peripheral apparatus, wherein the job execution controlling component further causes the processor: in response to a completion of processing corresponding image data of page n (n≧1) using a first function module at the create job step, to start a second function module at the edit job step to process image data of the page n; in response to a completion of processing at this edit job step, to start the first function module at the create job step to process image data of page (n+1), and at the same time to start a third function module at the output job step to process corresponding image data of the page n.

According to this configuration, even when the plurality of image processing are performed in parallel in time division, the overhead due to the conversion of the processing is reduced so that throughput can be improved, and the opportunities to execute the parallel processing of the image processing and the input and output processing increase more so that idle time of the process is reduced, thereby further improving throughput.

BRIEF DESCRIPTION OF THE DRAWINGS

FIG. 3 is an illustration showing a table for use in a job controlling module, and a corresponding relation between job codes of copying, printing, scanning, and fax transmitting and receiving and codes of function modules except edit modules selectively executed in respective jobs;

FIG. 5A is an illustration showing a configuration of a job step control (JSC) block, FIGS. 5B to 5D are illustrations showing an example of information described in an input JSC block, a process JSC block, and an edit JSC block, respectively;

FIG. 8 is a flow chart showing a processing of the process JSC module or the output JSC module according to a job order indicated by a job ID queue;

FIGS. 9A and 9B are illustrations showing contents of job ID queues before and after changing the job execution order, respectively;

FIGS. 10A and 10B are illustrations showing a change operation of job execution order;

FIG. 14 is an illustration showing a table for use in a job controlling module, and a corresponding relation between job codes of copying, printing, scanning, and fax transmitting and receiving and codes of function modules except edit modules selectively executed in respective jobs;

FIGS. 15A to 15E each are schematic sequence diagrams showing function modules sequentially started when executing jobs of copying, printing, scanning, and fax transmitting and receiving;

DESCRIPTION OF THE PREFERRED EMBODIMENTS

First Embodiment

Figure 20:
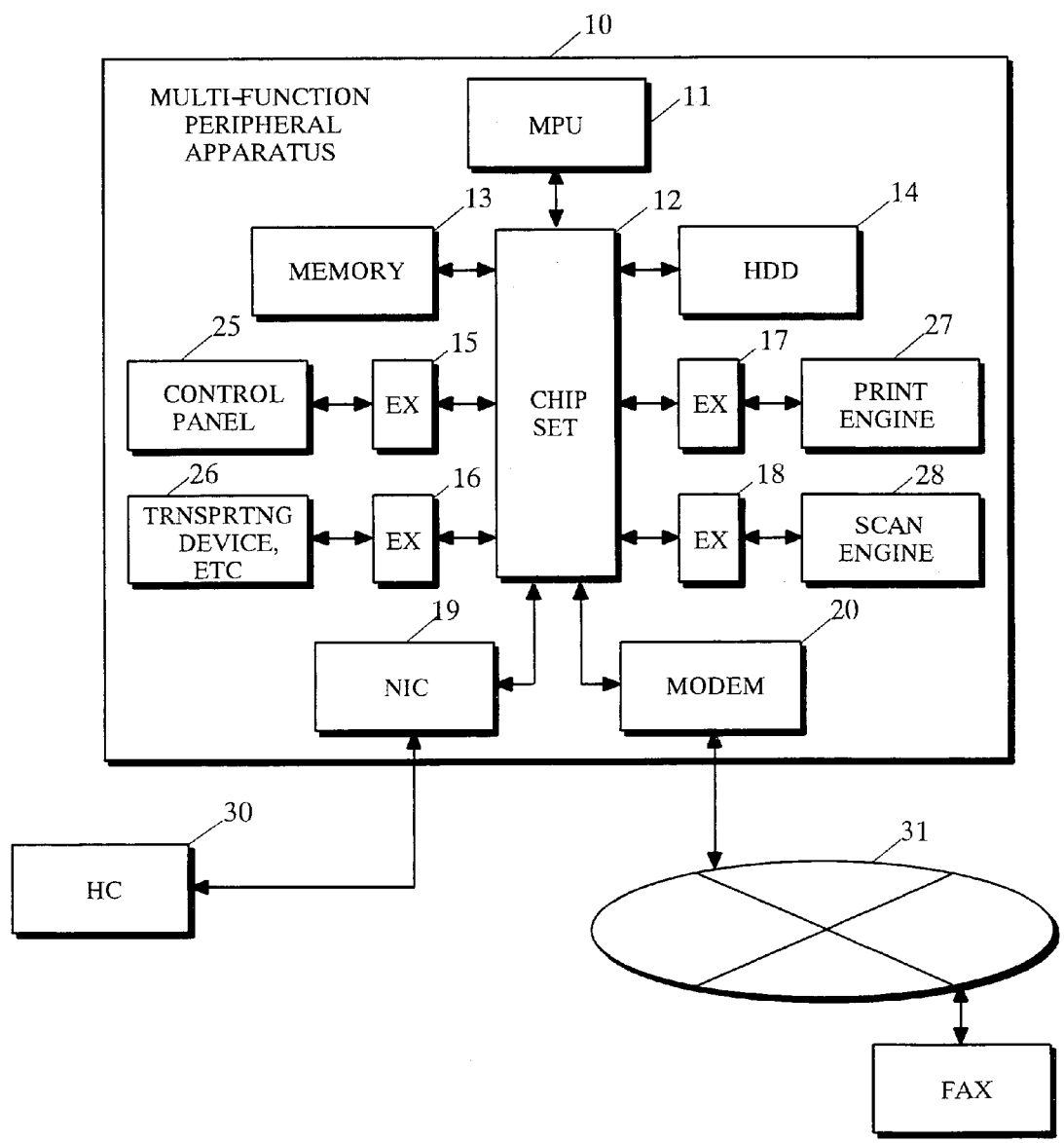
FIG. 20 is a schematic block diagram showing a hardware configuration of a multi-function peripheral apparatus according to embodiments of the present invention.

FIG. 20 is a schematic block diagram showing a hardware configuration of a multi-function peripheral apparatus 10 according to a first embodiment of the present invention.

The apparatus 10 has functions of copying, printing, scanning, and fax transmitting and receiving, and a process 11 is coupled via a set of chips 12 to a memory 13, a hard disk device 14, extension cards 15 to 18, a network interface card (NIC) 19, and a communication modem 20, wherein the extension cards 15 to 18 are coupled to an control panel 25, transporting device, etc. 26, a print engine 27, and a scan engine 28. For example, the extension cards 15 to 17 are PCI cards and the extension card 18 is a SCSI interface card for PCI bus. The NIC 19 and the communication modem 20 are coupled to an external NIC 30 and a public line network 31. The transporting device, etc. 26 comprises a paper transporting device, a fixing device and a finisher, etc.

The hard disk drive 14 stores a versatile operating system (OS) with a multi-thread function, an application for a multi-function peripheral apparatus operated on the OS, and a device driver operated under the OS.

Figure 1:
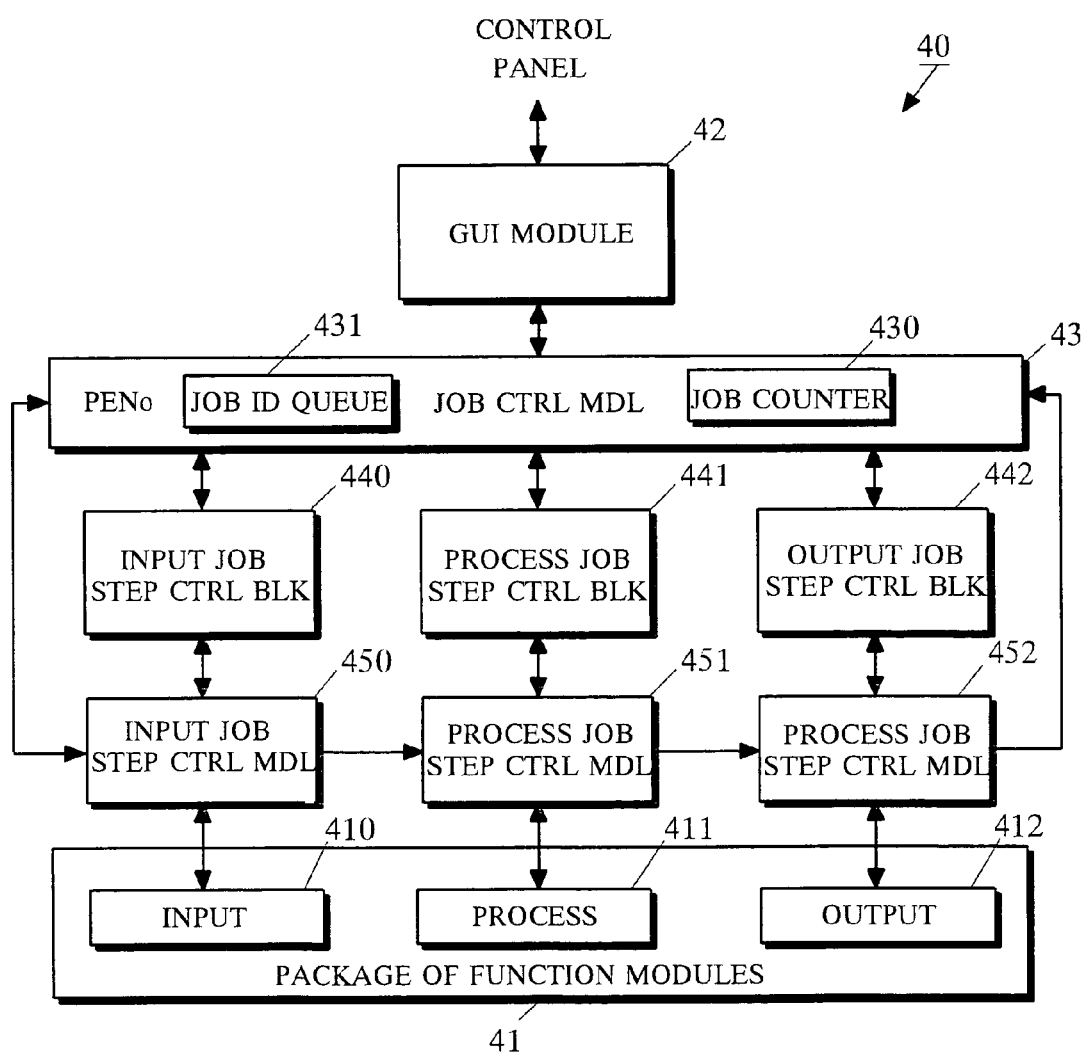
FIG. 1 is a schematic block diagram showing a whole configuration of application software for constituting a multi-function peripheral apparatus according to a first embodiment of the present invention.

FIG. 1 is a schematic block diagram showing a main body of this application 40.

While the above JP No. 2002-84383-A discloses application programs for all the job kinds, one feature of the first embodiment processes the respective jobs of copying, printing, scanning, and faxing with one integrated application, and divides the respective jobs into job steps of an input, a process, and an output with unity so that the configuration of software for the multi-function peripheral apparatus is simplified, thereby it improves the efficiency of developing software.

The respective jobs are executed by sequentially executing ones selected from a package of function modules 41. The function modules 41 are classified into a group of input function modules 410, a group of process function modules 411 and a group of output function modules 41, which corresponds to the three job steps.

Figure 2:
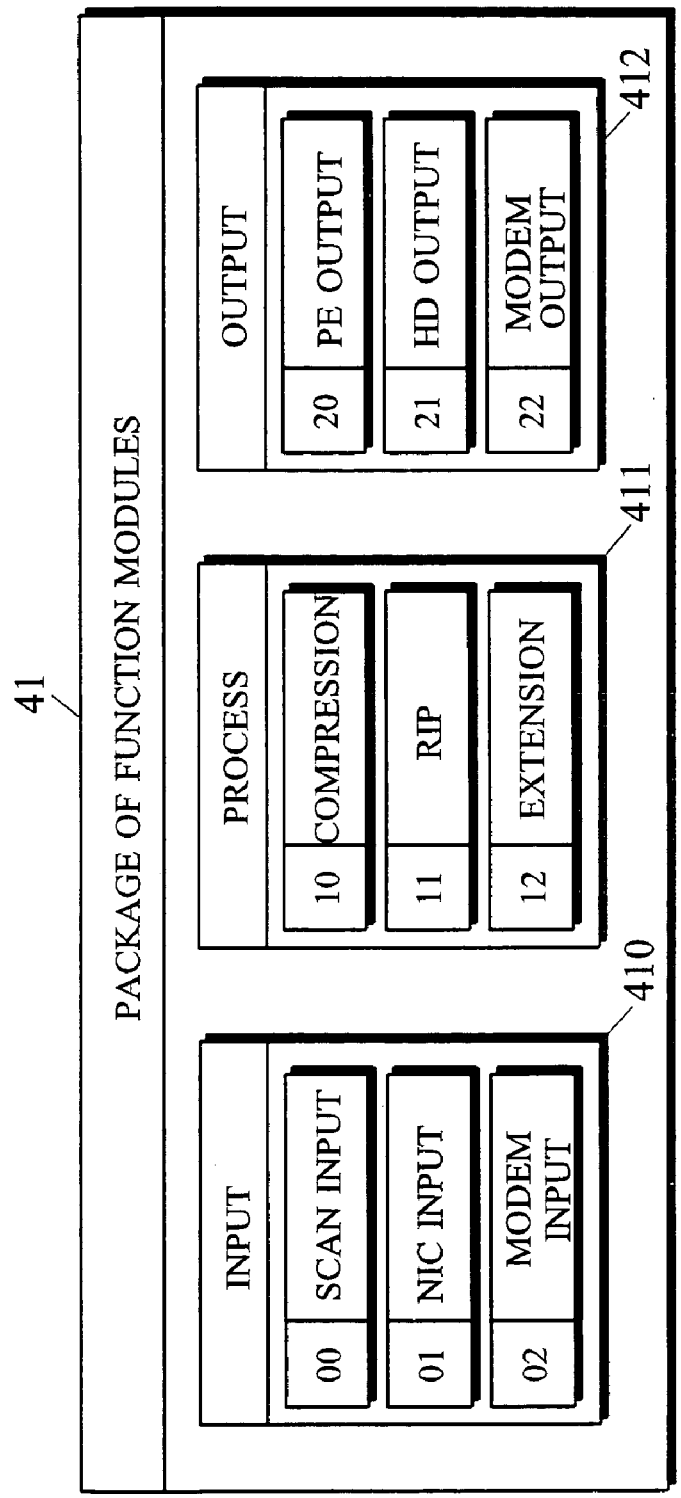
FIG. 2 is an illustration showing a plurality of function modules classified into three groups and selectively executed according to a job kind.
Figure 4A:
FIGS. 4A to 4E each are schematic sequence diagrams showing function modules sequentially started when executing jobs of copying, printing, scanning, and fax transmitting and receiving.
Figure 4B:
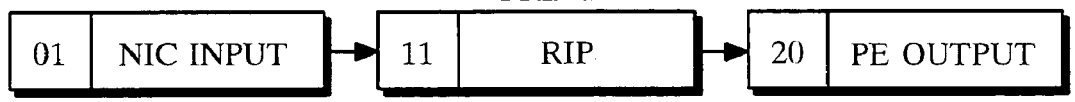
Figure 4C:
Figure 4D:
Figure 4E:

FIG. 2 is a block diagram showing the configuration of the package of function modules 41. Each function module has its identification code assigned for controlling a job and a job step. Although the function modules of the codes 10 and 12, respectively, execute a plurality of kinds of compression processing and a plurality of kinds of extension processing, FIG. 2 shows only one processing for each of them, for clarity.

The group of input function modules 410 includes function modules of codes 00, 01, and 02, and obtains data from the scan engine 28, the NIC 19, and the communication modem 20 of FIG. 20, respectively, to store them in the memory 13.

The group of process function modules 411 includes function modules of codes 10, 11 and 12 which transforms image data stored in the memory 13 by the function modules of codes 00, 01, and 02 into data formats of respective outputting devices. The function module of code 10 compresses data, the function module of code 11 executes the RIP processing, and the function module of code 12 executes the extension processing of the compressed data. The group of process function modules 411 may also include function modules of editing such as paginating or aggregating manuscript images of a plurality of pages into one sheet of a specific paper size, etc.

The group of output function modules 412 includes function modules of codes 20, 21, and 22 which respectively provide received data to the print engine 27, the hard disk device 14, and the communication modem 20, respectively.

Returning to FIG. 1, a GUI module 42 changes a display on the screen according to the operation of the control panel 25 by a user, and stores setting data input by a user into the memory 13. When the user selects one of copying, printing, scanning or faxing on a main menu, the GUI module 42 displays the settings of the job on the screen. If the user presses a start key after executing various settings with respect to the job, the GUI module 42 provides a job code of the selected job together with the setting information including default setting values to a job controlling module 43.

As shown in FIG. 3, let the job codes of copying, printing, scanning, fax transiting, and fax receiving be 0 to 4, respectively. For simplicity, "job step controlling" is denoted as JSC hereinafter.

Returning to FIG. 1, the job controlling module 43 creates a job step controlling blocks (JSC blocks) 440 to 442 in response to receiving a job code, creates a job by writing setting information into these blocks, and informs of a job creation completion including a job serial number JSNo to an input JSC module 450.

On a program, the creation of a JSC block corresponds to an instance creation of a structure or a class not including a method. Further, the notification from a module A to a module B means that the module B reads a variable whose value is substituted by the module A.

FIG. 5A shows a configuration of JSC block. The block includes a field of controlling information consisting of a function module code FMC, a job serial number JSNo, and a page number PNo, and fields of setting information arguments which are transferred before starting a function module.

The job controlling module 43 writes function module codes corresponding to a job code in the field of function module codes FMCs of the JSC blocks 440, 441 and 442 according to a table as shown in FIG. 3.

The job controlling module 43 has a job counter 430 and a job ID queue 431, and writes a value of the job counter 430 into the fields of the job serial number JSNo in the JSC block 440 to 442, and increments the job counter 430 by one after adding a job code to the head of the value of job counter 430 to make a job ID, and add the job ID to the job ID queue 431 (see FIG. 9). The job controlling module 43 also writes an initial value 1 in the fields of the page number PNo of the JSC blocks 440 to 442.

The job controlling module 43 divides the setting information received from the GUI module 42 into pieces of the setting information needed in the respective job steps by a predefined method, and writes them in the fields of the setting information of the respective JSC blocks 440 to 442.

FIG. 5B shows an example of the input JSC block 440 having the setting information of scan input being a monochrome, one side, A4 vertical, 400 dpi, and brightness value being 128. FIG. 5C shows an example of the process JSC block 441 having the setting information of pagination being an upper center, margin of 10 mm, form being —?— (? denoted a page number), a font being MS gothic, standard, and italics, and distance between letters being 0 mm. Likewise, FIG. 5D shows another example of the edit JSC block 441B having the setting information of aggregating manuscript images of four pages into one sheet of paper (4 in 1) in page order of top left, bottom left, top right, and bottom right without drawing division lines therebetween.

Returning to FIG. 1, each of the job step controlling modules (JSC modules) 450 to 452 starts (creates a thread) a corresponding function module in the group of function modules for each page (however, the JSC module 450 starts a function modules with respect to all the pages) as described below, and increments the page number PNo of corresponding one of the respective JSC blocks 440 to 442 according to the execution completion of the function module and also cause the JSC module at next right (downstream side) to create a thread controlling block as described below.

The JSC modules 450 to 452 are cyclically processed, for example, every 20 msec together with the job controlling module and the GUI module 42. Conversely, if a function module is started by any one of the JSC modules 450 to 452, it is operated as a thread independently of the JSC modules 450 to 452. Note that even in a case where the GUI module 42, the job controlling module, and the JSC modules 450 to 452 are operated as respective threads, the same results can be obtained.

Figure 6:
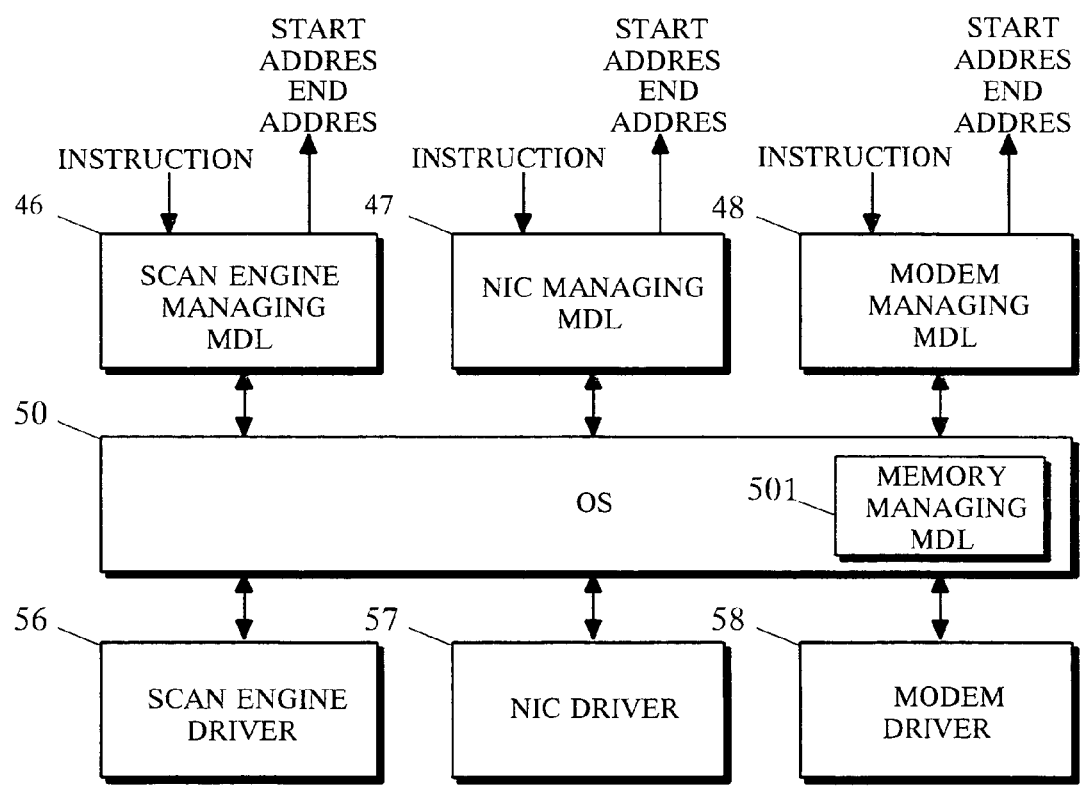
FIG. 6 is a block diagram showing hardware resource managing software relating to an image input.

Herein, the application 40 includes a scan engine managing module 46, a NIC managing module 47, and a MODEM managing module 48 of FIG. 6, in addition to the configuration of FIG. 1.

The managing modules 46, 47 and 48 communicate via a versatile OS 50 with a scan engine driver 56, a NIC driver 57, and a MODEM driver 58, respectively, in response to instructions from the function modules of FMC=00, 01 and 02, and controls the scan engine 28, the NIC 19, and the communication modem 20 of FIG. 20, respectively. The managing modules 46, 47 and 48 store the image data of pages input from the scan engine 28, the NIC 19, and the communication modem 20, respectively, via the memory managing module 501 of the OS 50 to the memory 13. Each of the managing modules 46, 47 and 48 confirms through the transmission of image data whether the memory managing module 501 has stored the image data of each page into the memory 13 of FIG. 20, and gets a storing start and end addresses to provide these addresses to corresponding function modules according to instructions from the function modules as described below.

Figure 7A:
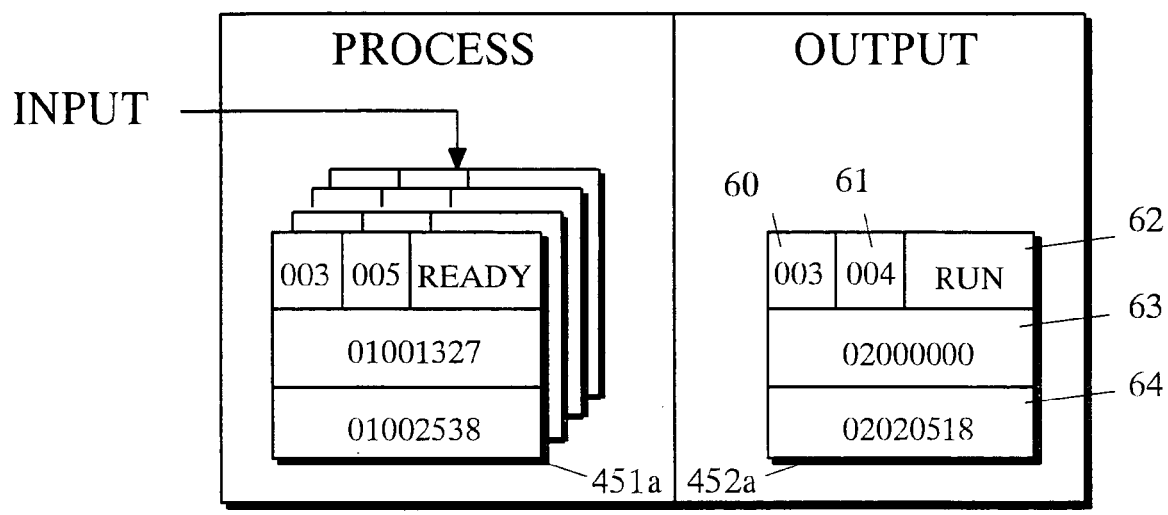
FIG. 7A is an illustration showing thread control blocks as controlling information of every page handled in a process JSC module and an output JSC module.
Figure 7B:
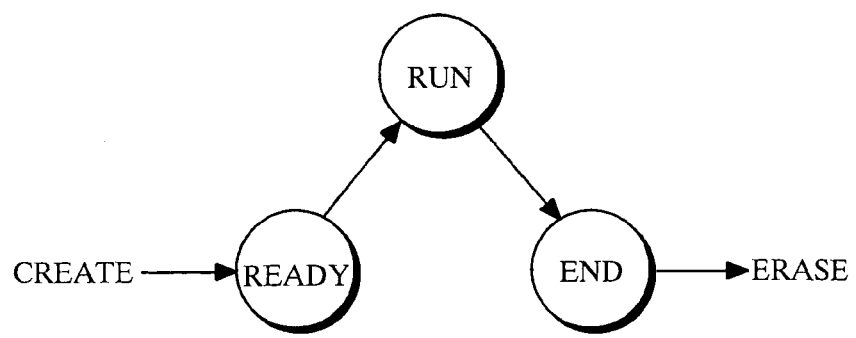
FIG. 7B is an illustration showing thread control states.

While the JSC blocks as described above are common controlling information to all the pages in the corresponding job steps, the process JSC module 451 and the output JSC module 452 use thread controlling blocks 451a and 452a, respectively, as controlling information for each page as shown in FIG. 7A.

The thread controlling block has the fields of a job serial number 60, a page number 61 whose page is processed by a function module, a thread controlling state 62, and the storing start address 63 and end address 64 of image data of the page number. The job serial number 60 is used to make correspondence with JSC block, and is further used to determine a job execution order as described below. An instance of a function module processes image data in the range between the start and end addresses.

The thread controlling state 62 has a "READY" state indicating an executable state, a "RUN" state indicating an executing state, and an "END" state indicating a completion of the executing. The thread controlling block is created with the "READY" state by a JSC module on the next upstream side. The thread controlling state 62 is made to the "RUN" state with starting a function module started by a JSC module to which the thread controlling block belongs. The function module make the thread controlling state 62 as a post-processing to be the "END" state immediately before its execution is completed. The JSC module to which the thread controlling block belongs deletes the thread controlling blocks of the "END" state.

Next, the operation of the input JSC module 450 will be described.

In response to the notification of the job creation completion from the job controlling module, the input JSC module 450 starts a function module IFM (creates an instance of the function module IFM) with giving the setting information of the JSC block 440 to the function module IFM identified by the FMC with reference to the input JSC block 440. The function module IFM make the corresponding inputting device input image data of one page via the managing modules 46, 47 or 48, and obtains the storing start and end addresses of the memory 13 to provide them to the input JSC module 450. In response to this, the input JSC module 450 make the process JSC module 451 create a process thread controlling block 451 with the "READY" state as shown in FIG. 7A.

When the input page is the final page, the input JSC module 450 informs the job controlling module 43 of the page number PNo as the final page number PENo.

Next, the operation of the process JSC module 451 will be described with reference to FIG. 8. Hereinafter, characters in a parenthesis denote step identifier in the drawings.

(S10) If there is a thread controlling block (SCB) of "RUN" state in the corresponding job step, the process of FIG. 8 ends. With this, since the image processing of other page or job is not made in parallel in time division, the overhead due to the switching between programs is not caused, thereby improving throughput. If there is not the SCB of "RUN" state, the process proceeds to a step S11.

(S11) If there is an SCB of "END" state, the process proceeds to a step S16 and otherwise, to a step S12.

(S12, S13) By taking out the next job serial number JSNo (the head of the job serial numbers in the beginning) in an alignment order in the job queue 431, if there is a thread controlling block (SCB) of "READY" state having the job serial numbers JSNo, the process proceeds to a step S15 and otherwise, to a step S14.

(S14) If there is no job serial number JSNo to be taken out in the job ID queue 431, the process of FIG. 8 ends and otherwise, returns to the step S12.

(S15) There is given the setting information written in the process JSC block 441 including the job serial number JSNo, and the image data storing start and end addresses written in the thread controlling block of "READY" state having the JSNo and the page number PNo which are equal to those written in the process JSC block 441, to the function module identified by the code FMC written in the process JSC block 441. Then the function module is started with the thread controlling state being made to "RUN" state. Then, the process of FIG. 8 ends.

With this starting, the function module processes the image data in the range between the start and end address independently of the operation of the JSC modules, stores the processed data into the memory 13 via the OS, and give the storing start and end address to the process JSC module 451. Further, the thread controlling state of the controlling block 451a is made to "END" state. Thereafter, the process of FIG. 8 ends.

(S16) As the post-processing, the page numbers of the corresponding JSC block is incremented by one, and the controlling block 451a with the thread controlling state being "END" is deleted. In addition, the output thread controlling block of the "READY" state as shown in FIG. 7A is created for the output JSC module 452.

The operation of the output JSC module 452 is identical with that of FIG. 8. In this case, by starting the function module in the step S15, the function module outputs the image data in the given address range from the corresponding outputting device. Further, in the step S16, the output JSC module 452 increments by one the page numbers written in the corresponding JSC block, and deletes the thread controlling block 452a of "END" state.

According to the process as described above, each of the jobs of copying, printing, scanning, fax transmitting, and fax receiving is executed by starting the function modules in the order indicated in FIG. 4A to 4E.

The job controlling module 43 of FIG. 1 discards the JSC blocks 440 to 442 of the corresponding job serial number JNo in response to deletion of the output thread controlling block of the final page number PENo by the output JSC module 452, and deletes a job ID (job code plus job serial number JNo) in the job ID queue 431 (see FIG. 9). As a result, the job is completed.

With this simple processing, the jobs are executed in an alignment order of the job serial numbers stored in the job ID queue 431 and in order of the page numbers PNo with respect to the same job serial numbers. Therefore, if the order of the job serial numbers in the job ID queue 431 is changed by the operation of a user, the execution order of the jobs is changed in job units.

Next, the job execution order will be described in relation to the order change operation by a user.

As described above, when a job is created, a job ID obtained by adding a job code to the head of the count of the job counter 430 is added to a job ID queue 431. When the output of all the pages for one job is completed in the output job step, the job ID is deleted from the job ID queue 431. Therefore, if a plurality of jobs remains, the contents of the job ID queue 431 becomes as shown in the FIG. 9A, for example. Corresponding to this, there are JSC blocks 440 to 442 corresponding to each of the job serial number in the job ID queue 431.

The contents of the job ID queue 431 and the JSC blocks 440 to 442 can readily be used even in the GUI. That is, when a user presses job state displaying key on the control panel 25, the GUI module 42 queries the job state to the job controlling module 43, and in response to this the module 43 reads the contents of the job ID queue 431, and reads the page numbers PNo written in the JSC blocks 440, 441 and 442 with respect to each of the job serial numbers JSNo. On the basis of these, the scheduling time of the output completion is approximately calculated, and then is given to the GUI module 42. The GUI module 42 displays this on the control panel 25.

With this, for example, the display as shown in FIG. 10A is made. In the drawings, No. denotes the job serial number JSNo, and No. column corresponds to the JSNos in order in the job ID queue 431 of FIG. 9A. The columns of input, process and output denotes page numbers PNo written in the corresponding JSC blocks 440, 441 and 442, and the numbers PNo indicate the numbers of completed pages.

The control panel 25 comprises a touch panel. On the panel, an up key 66, a down key 67, a priority key 68, and a cancel key 69 are displayed. These keys are used as follows when the job execution order is changed.

Figure 11A:
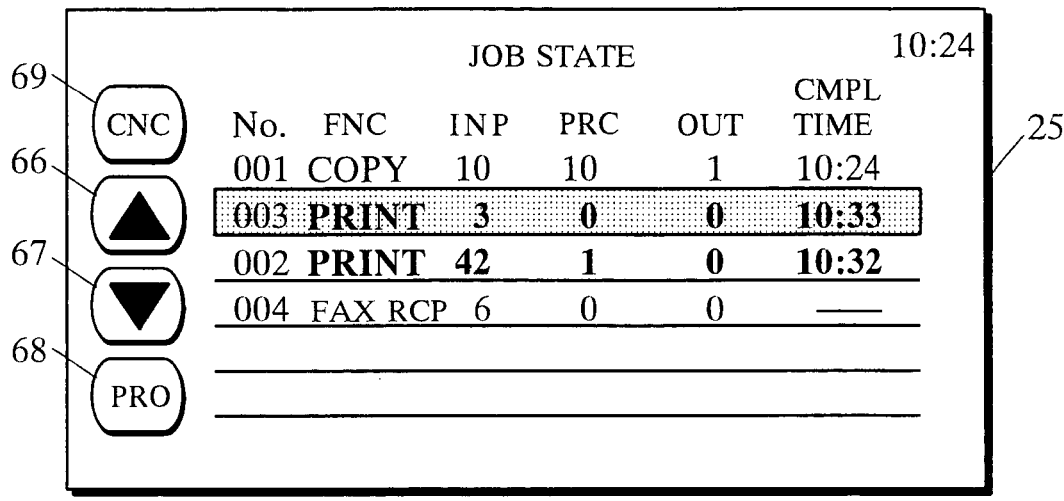
FIGS. 11A and 11B are illustrations showing a change operation of job execution order, followed by FIG. 10B.
Figure 11B:
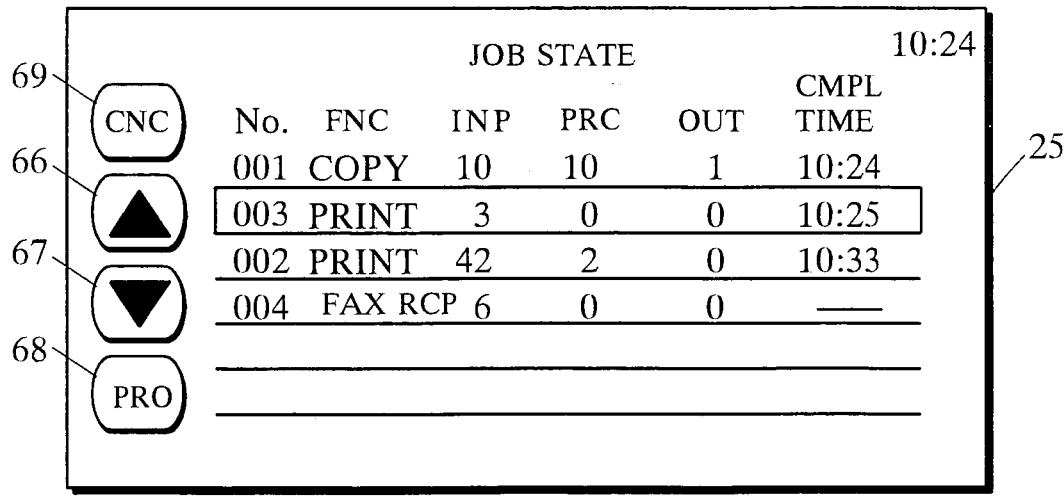

For example, in FIG. 10A, when a user wants to execute the job of No. 3 prior to the job of NO. 2, he presses the down key 67 twice to move a rectangle at No. 1 to No. 3, and then presses the priority key 68. With this, as shown in FIG. 10B, a grid pattern is displayed within the rectangle to make the object to be changed to a selected state. Next, if the up key 66 is pressed once, the rectangle moves up by one step so that it becomes as shown in FIG. 11A. In this state, if the priority key 68 is pressed, the movement is determined so that the grid pattern is erased as shown in FIG. 11B. On the other hand, the corresponding job codes added to heads of the respective values in the No. column are overwritten in this order on the job ID queue 431 as the job IDs by the GUI module 42. FIG. 9B shows the overwritten contents which correspond to the No. column of FIG. 11B. If the cancel key 69 is pressed instead of the priority key 68, the display returns to the initial state shown in FIG. 10A.

As described above, according to the present first embodiment, the configuration of the application 40A for the multi-function peripheral apparatus is simplified and unified with respect to all the jobs, thereby improving development efficiency of application software.

Further, since the package of function modules is provided and selected modules thereof are started according to the job kind by the controlling module, each job is handled in an equal relation with respect to the job execution order. Meanwhile, since job state is displayed by using the controlling information used in the controlling module and the job execution order is changed by using this, it is possible to change the execution order in job units by a simple configuration.

In addition, since the job steps of the respective jobs are unified, in the output job step as well as the process job step, if there is a job step of the unprocessed executable job number with reference to the alignment order of the job numbers in the queue, it is very easy to execute corresponding function module in page units. Therefore, it is possible to preferentially process and output an emergency-job while keeping throughput high, with a simple software configuration.

Second Embodiment

While in the above first embodiment, jobs are unified by dividing each job into the job steps of input, process, and output, in the second embodiment of the present invention, the process job step of each job is further divided into a create job step and a edit job step. In order to simplify the software configuration by commonly using the edit job step in each job, the image data format input from the input job step is transformed into bit map data format in the create job step.

Figure 12:
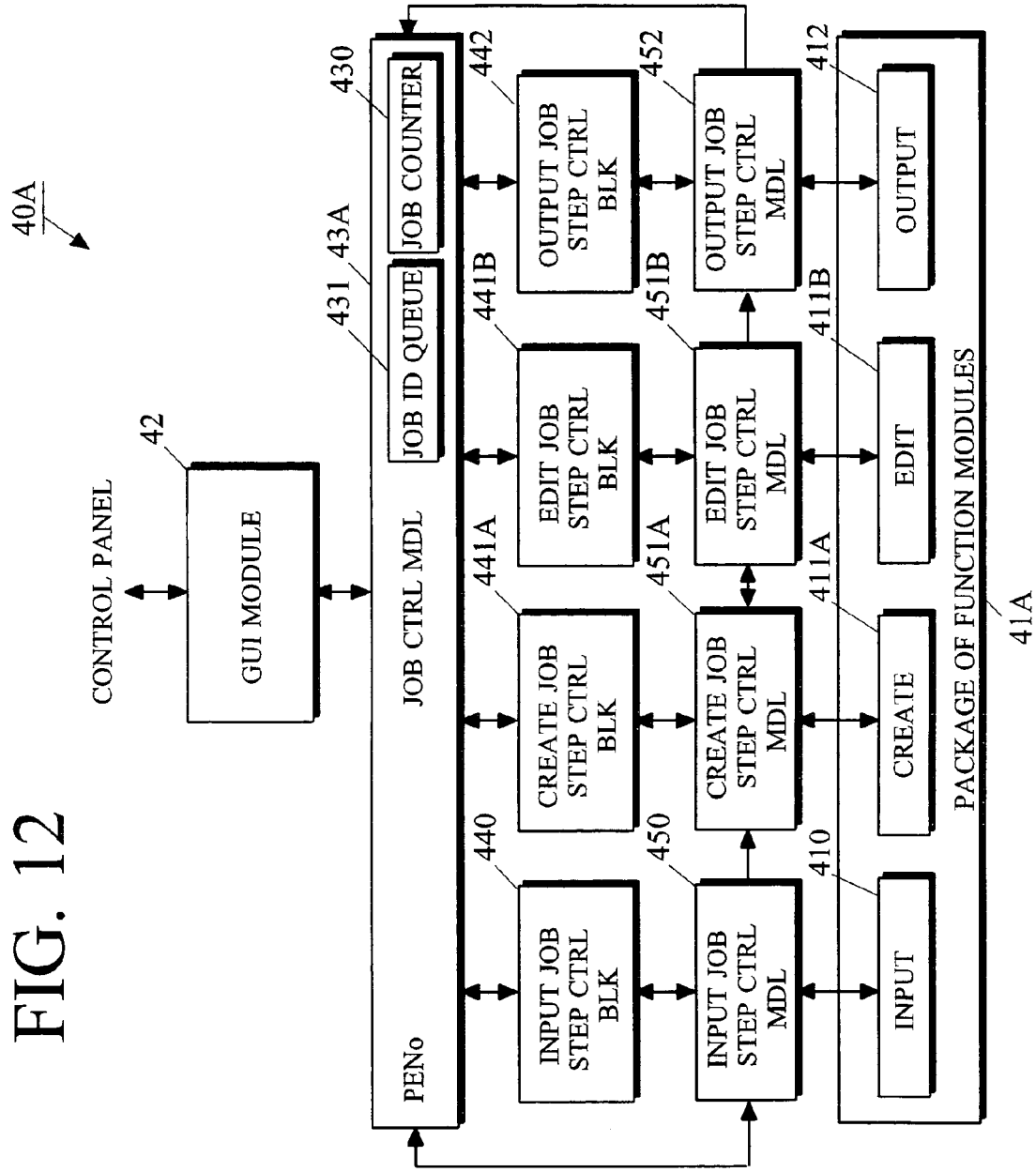
FIG. 12 is a schematic block diagram showing a whole configuration of application software for constituting a multi-function peripheral apparatus according to a second embodiment of the present invention.

The hardware configuration of the multi-function peripheral apparatus relating to the second embodiment is identical with that of the first embodiment. FIG. 12 is a schematic block diagram showing a main body of an application 40A in the second embodiment.

In the package of function modules 41A, in correspondence with the division, the group of process function modules 411 of FIG. 1 is divided into a group of create function modules 411A and a group of edit function modules 411B.

Figure 13:
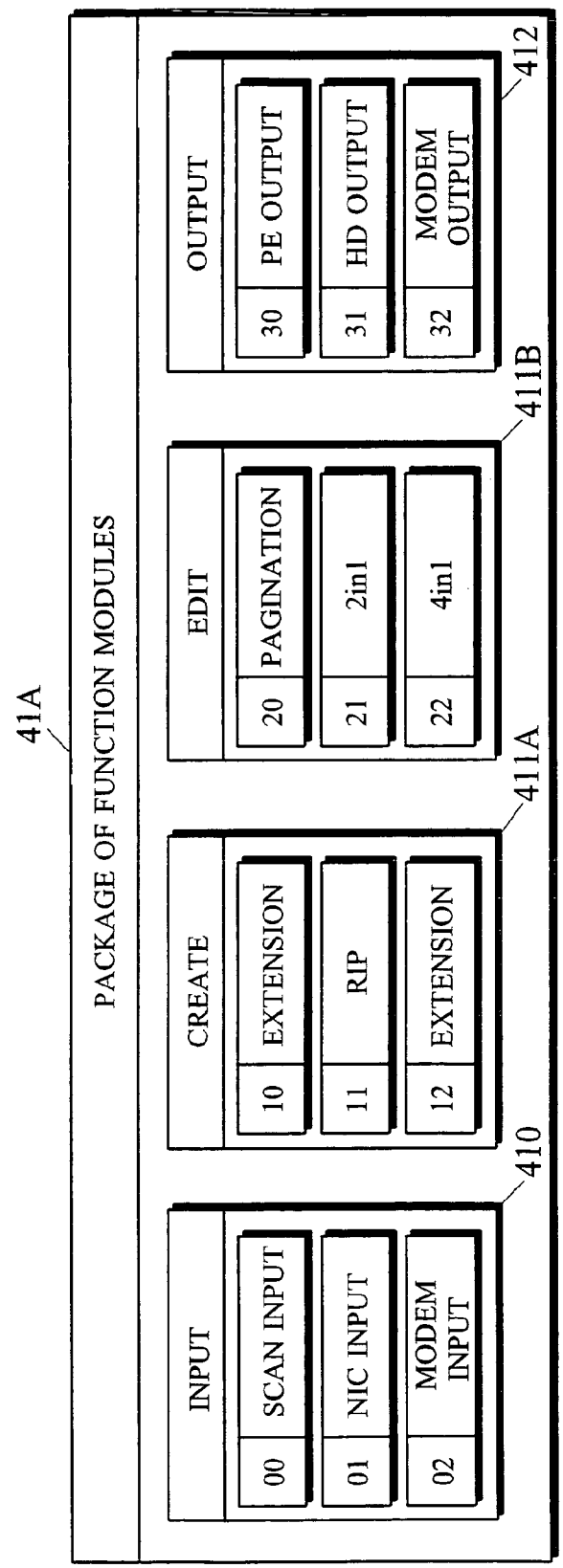
FIG. 13 is an illustration showing a plurality of function modules classified into four groups and selectively executed according to a job kind.

FIG. 13 is a block diagram showing the configuration of the package of function modules 41A.

The group of create function modules 411A includes function modules bearing codes 10, 11, and 12 which transform one page of image data stored in the memory 13 into bitmap data. The function module of the code 11 executes a RIP processing and the function modules of codes 10 and 12 execute an extension processing for compressed data.

Since the data format is unified by the processing of the group of create function modules 411A, in the edit job step, a common processing not depending on inputting device can be executed. The group of edit function modules 411B includes the function modules bearing codes 20, 21, and 22 which paginates, aggregates manuscript images of two pages into one sheet of paper (2 in 1), and manuscript images of four pages into one sheet of paper (4 in 1), respectively, for image data stored in the memory 13 by the group of create function modules 411A.

The group of output function modules 412 includes the function modules of codes 30, 31, and 32, which provides the image data edited by the group of edit function modules 411B as it is to the print engine 27, transforms them into a prescribed format to output it to the hard disk device 14, and transforms them into a prescribed format to output it to the communication modem 20, respectively.

The process JSC block 441 of FIG. 1 is divided into a create JSC block 441A and a edit JSC block 441B of FIG. 12 in correspondence with the division, and the process JSC module 451 of FIG. 1 is also divided into a create JSC module 451A and a edit JSC module 451B of FIG. 12.

The job controlling module 43A writes function module codes corresponding to a job into the fields of function module codes FMC on the JSC blocks 440, 441A and 442 according to a table as shown in FIG. 14, and writes the codes 20, 21 or 22 into the field of function module code FMC on the edit JSC block 441B according to the kinds of edit included in the setting information received from the GUI module 42.

Next, in order to improve throughput, how to establish the execution order of function modules will be described.

Figure 16A:
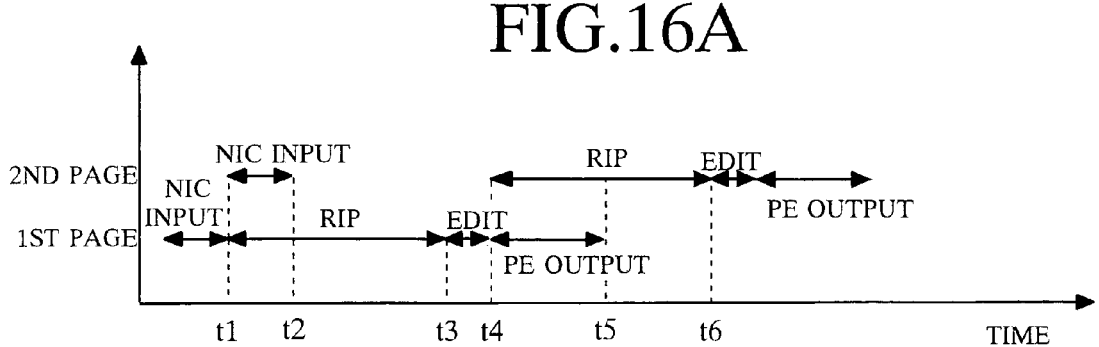
FIG. 16A is a schematic time chart showing a print job operating example of a second embodiment of the present invention.
Figure 16B:
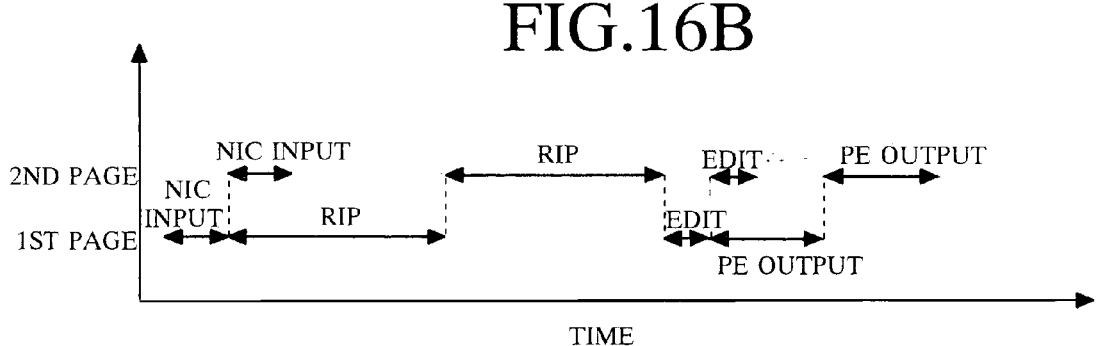
FIGS. 16B and 16C are schematic time charts showing print job operating examples compared with FIG. 16A in order to indicate an advantage of FIG. 16A's operation.
Figure 16C:
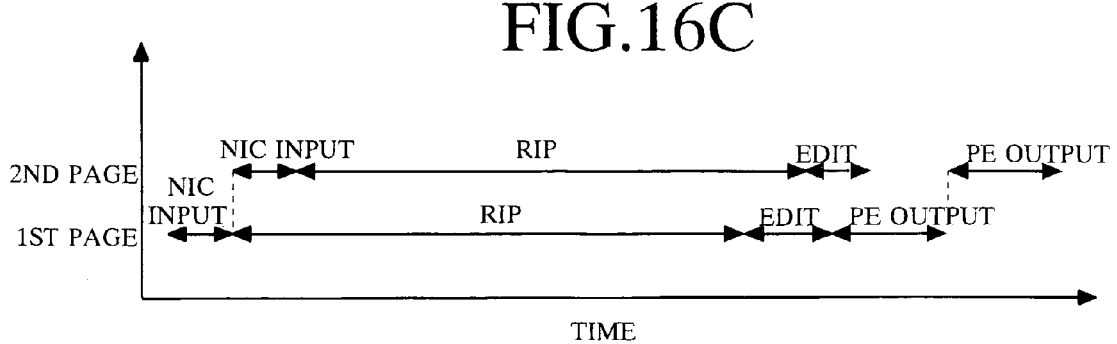

FIG. 16C is drawn to compare with FIG. 16A, and shows a case where the image data of another page is processed in parallel in the print job.

The multi-function peripheral apparatus receives image data for a print described in a page description language (PDL) from the host computer 30, convert it into bitmap data (RIP) to provide it to the print engine 27 to print it on a paper. In this case, there is executed the RIP processing of the first page while receiving the data of the second page. Next, there is executed the RIP processing of the second page while executing the RIP processing of the first page.

According to the execution in time division multiplexing as above, an overhead due to switching between programs occurs, thereby degrading throughput. Further, during printing of the first page, since the print of the second page is waiting, that is, since there is a tendency that a plurality of output terms overlap to each other, idle time of MPU occurs, thereby degrading throughput.

FIG. 16B is drawn to compare with FIG. 16A and shows a case where EDIT processing is seamlessly executed in page order after RIP processing is seamlessly executed in page order. This case also lead to degrade throughput as the above case.

Hereinafter, a case will be described where the sequence of executing function modules is as shown in FIG. 16A.

In this case, after RIP processing is completed, EDIT processing of the same page is executed. Next, the print output processing of this page and RIP processing of the next page are executed in parallel.

According to this sequence, when a plurality of image processing are performed in time division multiplexing, the overhead due to switching processes is reduced so that throughput can be improved, and the opportunities to execute the parallel processing of image processing and input or output processing increases so that idle time of MPU 11 is reduced, thereby further improving throughput.

Although FIG. 16A shows a case of print job, since each of other jobs is also divided into four job steps so that the same effect can be obtained even in a case where other jobs are processed in parallel.

Note that in a case of the combination of at least two of copying, printing or fax receiving, since their outputting device is a common print engine, image data to be output are collected every job and the image data are output in job units, for example, in order of FIFO.

Next, the starting order and starting condition of function modules will be described.

(1) Regarding the same job serial number JSNo and same page number PNo, input function module, create function module, edit function module, and output function module are started in this order.

According to this, in execution of jobs of copying, printing, scanning, fax transiting, and fax receiving, function modules are started in order shown in FIG. 15A to (E).

Figure 17:
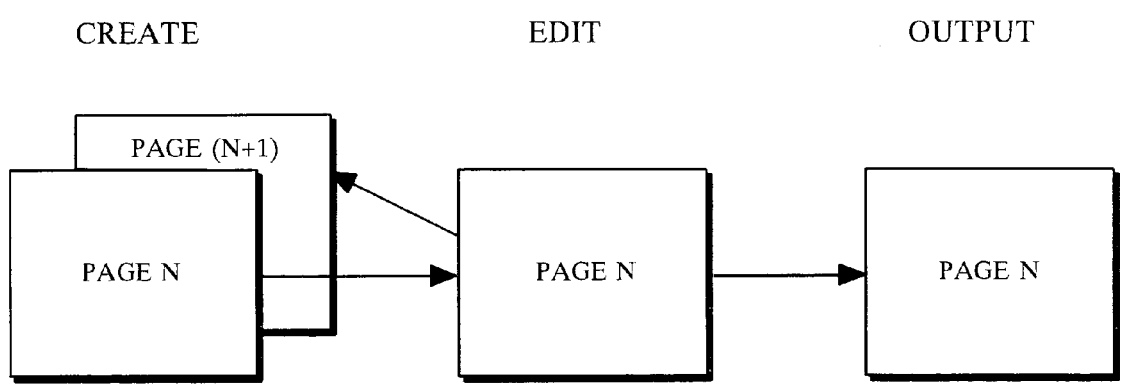
FIG. 17 is an illustration showing starting conditions of a create, an edit, and an output function modules for improving throughput.

(2) As shown in FIG. 17, when the process of create function module for page 'n' is completed (a create thread for page 'n' is erased), edit function module for page 'n' is started (an edit thread for page 'n' is created). When the process of edit function module for page 'n' is completed, output function module for page 'n' is started (an output thread for page 'n' is created), and at the same time, create function module for page 'n+1' is started.

Figure 18:
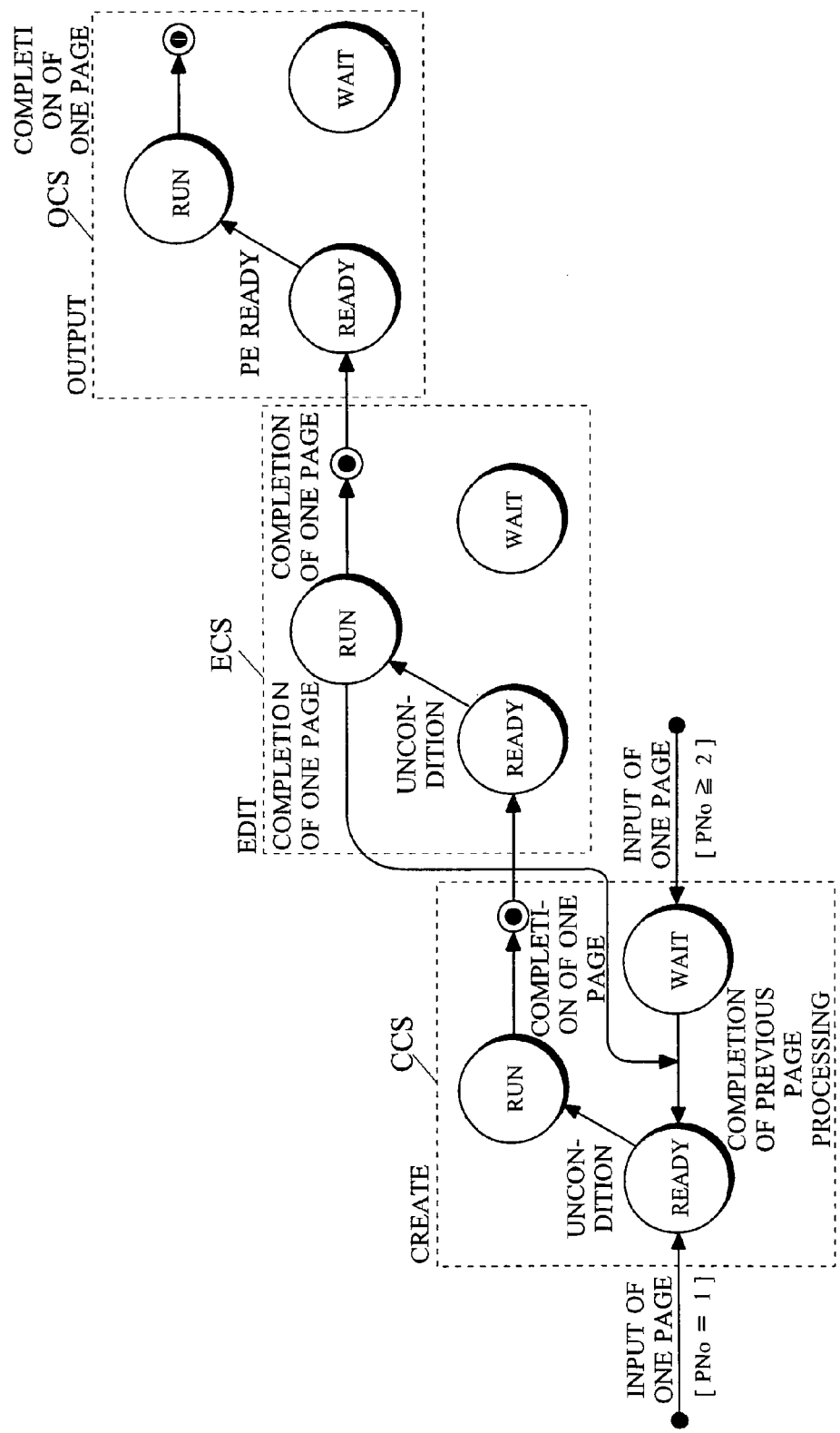
FIG. 18 is a thread state transition diagram of a create module control state CCS, an edit module control state ECS, and output module control state OCS.

FIG. 18 is a transition diagram showing a create module controlling state CCS, an edit module controlling state ECS, and an output module controlling state OCS (thread state).

Figure 19:
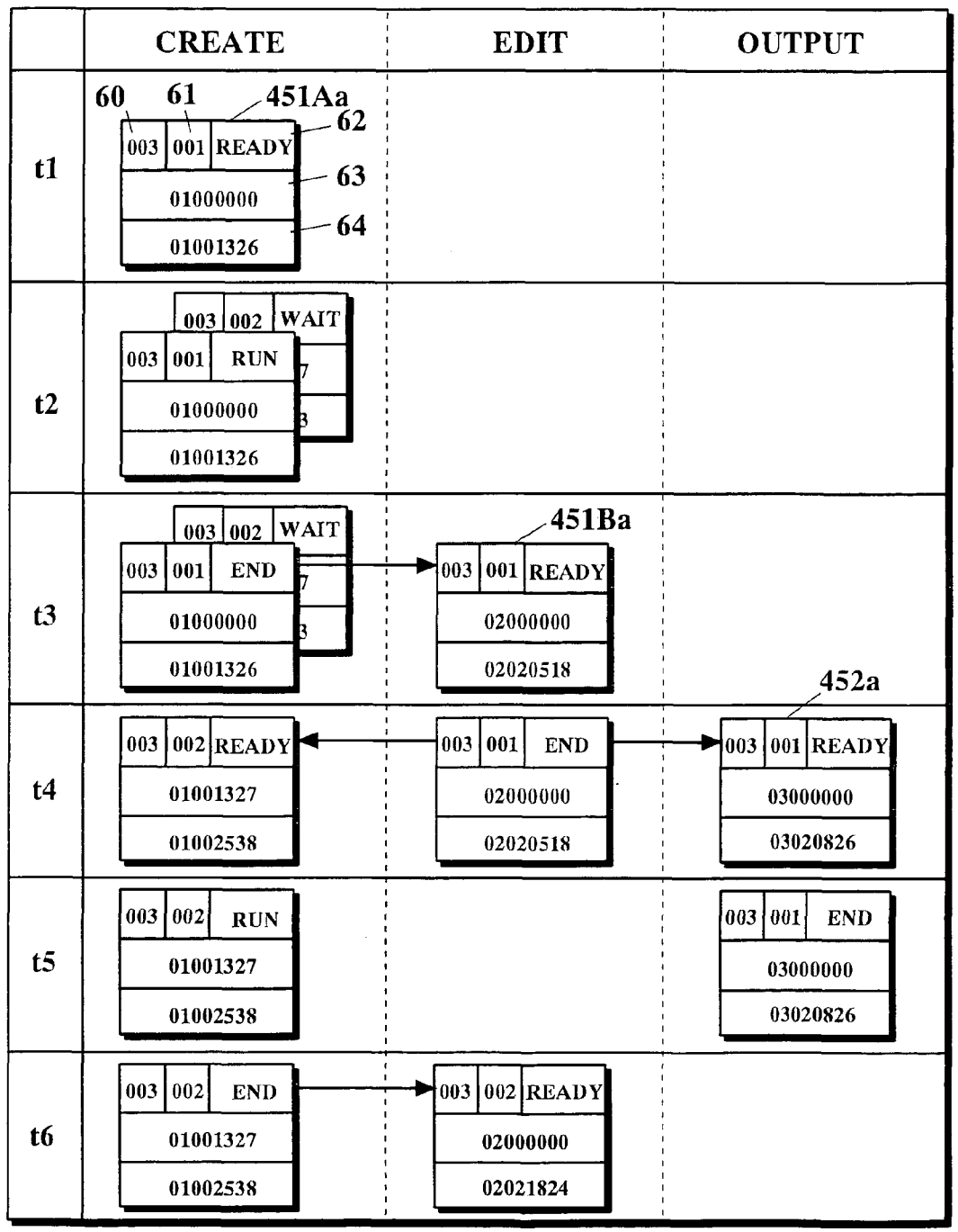
FIG. 19 is an illustration showing a thread control block corresponding to a state change of FIG. 18 at times t1 to t6 shown in FIG. 16A.

FIG. 19 shows thread controlling blocks 451Aa, 451Ba and 452a at times t1 to t6 of FIG. 16A, corresponding to the state changes of FIG. 18. The configuration of each thread controlling block is identical with that of the first embodiment.

Next, the operation of the JSC module and the function modules controlled by the JSC will be described with reference to FIGS. 18 and 19.

In response to the notification of job creation completion from the job controlling module 43A, (A) the input JSC module 450 starts a function module IFM (creates an instance of the function module IFM) after giving the setting information on the JSC block 440 to the function module IFM identified by FMC on the JSC block 440. The function module IFM control a corresponding inputting device via the managing module 46, 47 or 48 of FIG. 6 to input image data of one page, and receives a storing start address and a storing end address to give them to the input JSC module 450. In response to this, the input JSC module 450 increments the page numbers PNo on the JSC block 440 by one, and creates a create thread controlling block 451A having "READY" state in a case of the first page (at t1 of FIG. 16), or having "WAIT" state in a case after the second page (t2) for the create JSC module 451A, and then returns to the head of this item (A).

In a case where the input page PNo is final, the input JSC module 450 informs the job controlling module 43A of FIG. 12 the page number PNo as the final page number PENo.

(B) The create JSC module 451A starts a function module CFM after giving the setting information on the create JSC block 441A and the address range information of storing the image data on the create thread controlling block 451Aa to the function module CFM identified by FMC on the create JSC block 441A, and make the create thread controlling state written on the create thread controlling block 451A the "RUN" state. The function module CFM transforms the image data in the address range into bitmap data format, and stores it in the memory 13 via the OS, gives the storing start address and the storing end address thereof to the create JSC module 451A, and make the create thread controlling state written on the create thread controlling block 451A the "END" state. In response to this, the create JSC module 451A increments the page numbers PNo on the create JSC block 441A by one, and creates an edit thread controlling block 451Ba having "READY" state (t3) for the edit JSC module 451B, and erases the completed create thread controlling block.

(C) The edit JSC module 451B starts a function module EFM after giving the setting information on the edit JSC block 441B and the address range information of storing the image data on the edit thread controlling block 451Ba to the function module EFM identified by FMC on the edit JSC block 441B, and make the edit thread controlling state written on the create thread controlling block 451B the "RUN" state. The function module EFM edits the image data in the address range, and stores the result of editing in the memory 13 via the OS, gives the storing start address and the storing end address thereof to the edit JSC module 451B, and make the edit thread controlling state written on the edit thread controlling block 4511Ba the "END" state. In response to this, the edit JSC module 451B increments the page number PNo on the edit JSC block 441B by one, creates an output thread controlling block 452a having "READY" state for the output JSC module 452, changes "WAIT" state on a create thread controlling block 451Aa of the next page to "READY" state (t4) for the create JSC module 451A, and erases the completed edit thread controlling block 451Ba.

However, for example, in a case where the edit is 4 in 1 as described above, the function module EFM executes the arrangement of the page every time the create process of one page is completed, repeats it for four pages, and then erases the edit thread controlling block 451Ba.

(D) The following operation is executed simultaneously with proceeding to the (B) for the next page. That is, the output JSC module 452 starts a function module OFM after giving the setting information on the output JSC block 442 and the address range information of storing the image data on the output thread controlling block 452a to the function module OFM identified by FMC on the output JSC block 442, and make the output thread controlling state written on the output thread controlling block 452a the "RUN" state. The function module OFM causes the corresponding output device to output the image data in the address range, and make the output thread controlling state "END" state after the completion of the output. In response to this, the output JSC module 452 increments the page numbers PNo on the output JSC block 442 by one, and erases the completed output thread controlling block 452a.

The job controlling module 43A of the FIG. 12 responds to erasing the output thread controlling block of the final page number PENo by the output JSC module 452 to discard the JSC blocks 440 to 442 of the job serial numbers JNo, and deletes the job ID having this job serial number JNo from the job ID queue 431 (see FIG. 9). With this, the job is completed.

The more detailed operation of the create JSC module 451A is executed according to the flow chart of FIG. 8 described in the first embodiment. In this case, the relation of the create JSC module 451A and the edit JSC module 451B is identical with that of the process JSC module 451 and the output JSC module 452.

The edit JSC module 451B and the output JSC module 452 are the same as described above.

Other aspects are the same as the first embodiment described above. Job state is displayed as shown in FIG. 10 and FIG. 11 without dividing the process job step into the create job step and the edit job step, thereby avoiding complication.

As described above, according to the second embodiment of the present invention, since the configuration of the application 40A for the multi-function peripheral apparatus is simplified and is unified for all the jobs, the effects described in the first embodiment can be obtained.

Further, since the overhead due to switching processes in time division multiplexing is reduced, throughput can be improved, and the opportunities to execute the parallel processing of the image processing and the input or output processing are many so that idle time of MPU 11 is reduced, thereby further improving throughput.

In addition, since the group of edit function modules 411B is common to all the jobs, the configuration of the application 40A is simplified and the development efficiency of application software for the multi-function peripheral apparatus 10 is improved.

Moreover, since the job steps of the respective jobs are unified, in the output job step as well as the process job step, if there is a job step of the unprocessed executable job number with reference to the alignment order of the job numbers in the queue 431, it is very easy to execute corresponding function module in page units. Therefore, it is possible to preferentially process and output an emergency job while keeping throughput high, with a simple software configuration.

Although preferred embodiments of the present invention has been described, it is to be understood that the invention is not limited thereto and that various changes and modifications may be made without departing from the spirit and scope of the invention.

For example, although logic configurations of the application are described in the above embodiments, the logic configuration can be implemented in various ways. For example, it can be realized by an event driven type program wherein function modules are started by generation of an event when the controlling block is "READY" state.

Further, only job serial numbers may be inputted into the job ID queue 431 together with making a table of job serial numbers and corresponding job codes. A set of function module codes may be determined by using a corresponding job code in the job ID queue 431 and the table of FIG. 3 or FIG. 14 without writing the codes of the function modules in the JSC tables 440 to 442. Job serial number as job number may be the combination of job code and serial number for each job code. That is, the information of a job kind may be added to a job number to make a job serial number. Each of the JSC blocks 440 to 442 of FIG. 1 or FIG. 12 may be configured as attributes of a class of corresponding one of JSC controlling modules 450 to 452 or as attributes of a class of job controlling module 43. That is, there may be various expression of job controlling information for controlling module.

Further, since the feature of the present invention is to improve development efficiency of application software by relating and unifying the job steps of the plurality kinds of jobs, the create function modules may transform the image data format input at the input job step into other respective formats, and the same format other than the bitmap format may be used. In addition, a configuration not capable of improving throughput as described above may be employed. For example, a configuration capable of executing a plurality of image processing in parallel as in FIG. 16C may be employed.

Further, although the edit JSC module 451B has no problem through processing as shown in FIG. 8B, after the process is completed in the create JSC module 451A as described above, in a case where the function block is executed with respect to the thread controlling block having the same job serial numbers JSNo and the page numbers PNo as the object to be processed, the steps S12 to S14 can be omitted in FIG. 8

The limitation described with reference to FIG. 17 may be implemented in such a way that in the create JSC module 451A, a step is added between the steps S13 and S15 of FIG. 8 to end the process if the create SCB and the edit SCB both are "READY" state in regard to the same page number, and otherwise to proceed to step S15.

In addition, in regard to the processing having transition from "READY" state to "RUN" state unconditionally in FIG. 18, a configuration omitting "READY" state may substantially be identical with that of FIG. 18.

What is claimed is:

1. A multi-function peripheral apparatus, comprising:
a processor operated according to a program;
a storage means coupled to the processor to store the program;
a plurality of image data inputting means coupled to the processor;
a plurality of image data outputting means coupled to the processor; and
an instruction inputting means coupled to the processor;
wherein the apparatus executes a job selected from a plurality of image forming functions by an instruction through the instruction inputting means,
wherein the program comprises:
a package of function modules to be executed by the processor in each job step of each job having an input job step of inputting image data from a corresponding one of the plurality of image data inputting means, a create job step for transforming a data format of respective image data from the plurality of image data inputting means at the input job step into a specific common data format, an edit job step for editing the transformed image data, and an output job step of providing the edited image data to corresponding one of the plurality of image data outputting means; and
a job execution controlling program for, according to a job selection and a starting instruction through the instruction inputting means, causing the processor to execute function modules corresponding to respective job steps of the selected job so that the selected job is executed in order of the input job step, the create job step, the edit job step, and the output job step with respect to each page of the selected job,
wherein the job execution controlling component further causes the processor:
in response to a completion of processing corresponding image data of page n (n≧1), using a first function module at the create job step to start a second function module at the edit job step to process image data of the page n,
in response to a completion of processing at this edit job step, to start the first function module at the create job step to process image data of page (n+1), and at the same time to start a third function module at the output job step to process corresponding image data of the page n.

2. The multi-function peripheral apparatus according to claim 1, wherein the storage means further stores function module combining information for associating function module identifiers identifying respective function modules executed in the respective job steps of a job of each image forming function with the respective job steps,
wherein the job execution controlling program comprises:
a job controlling component which causes the processor, according to the job selecting instruction, to extract corresponding function module identifiers from the function module combining information and then to distribute the extracted corresponding function module identifiers to the respective job steps, and to distribute setting information to the respective job steps; and
a job step controlling component which causes the processor, on the basis of the distributed identifiers and setting information, to start function modules corresponding to the input job step, the create job step, the edit job step, and the output job step in this order with respect to the same page of the same job.

3. The multi-function peripheral apparatus according to claim 1, wherein the specific data format is a bitmap format.

4. The multi-function peripheral apparatus according to claim 1, wherein the editing of the transformed image data includes a pagination processing or an aggregating processing of reducing the image data of a plurality of pages to arrange them on one page.

5. The multi-function peripheral apparatus according to claim 1, wherein the storage means further stores a job identification code queue as job controlling information,
wherein the job execution controlling program comprises:
a job execution order controlling component which causes the processor
(a) to determine a job identification code according to the job selection and starting instruction through the instruction inputting means,
(b) to add the job identification code into the queue,
(c) to read a job identification code in the job identification code queue in alignment order,
(d) to execute function modules of the respective job steps of the job indicated by the job identification code read; and
a job execution order changing component which causes the processor to change the alignment order of the job identification codes in the job identification code queue according to a job execution order changing instruction through the instruction inputting means.

6. The multi-function peripheral apparatus according to claim 5, wherein the job execution order controlling component causes the processor:
to execute the step (c) in each of the image processing job step and the output job step; and
to execute, in the step (d), a corresponding function module if there is an unprocessed job step of an uncompleted executable job.

7. The multi-function peripheral apparatus according to claim 6, wherein the storage means further stores, for each job step, job step controlling information having a combination of a job identification code of an uncompleted job, a job kind, and information about a completed page number,
wherein the job identification code queue is included in the job step controlling information,
wherein the job execution order changing component causes the processor, with reference to the job step controlling information:
to display a job state with respect to each job identification code on the display means in an alignment order of the job identification codes in the job identification code queue, the job state having the job identification code of the uncompleted job, the job kind, and the information about the completed page number of the respective job steps, and to change the order of the job states on the display means in response to the instruction through the instruction inputting means.

8. The multi-function peripheral apparatus according to claim 7, wherein the job execution order changing component further causes the processor, with respect to each job identification code, to estimate job completion times on the basis of the information about the completed page numbers of the respective job steps, wherein the job completion times are included in the corresponding job state.

9. The multi-function peripheral apparatus according to claim 8, wherein the job step controlling information further includes, with respect to each job step, related information of an identifier of a function module to be executed, a page number of a page to be processed, and a processing state of the page, and wherein the job execution order controlling component causes the processor to refer to the processing state of the job step controlling information in order to determine at the step (c) if there is an unprocessed job step of an uncompleted executable job.

* * * * *